United States Patent
Starr

(10) Patent No.: US 7,564,797 B2
(45) Date of Patent: *Jul. 21, 2009

(54) METHOD AND SYSTEM FOR CONVEYING MULTIPLE CALLS ON A SINGLE TELEPHONE LINE

(75) Inventor: Thomas J. J. Starr, Barrington, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/070,618

(22) Filed: Mar. 2, 2005

(65) Prior Publication Data
US 2005/0147128 A1 Jul. 7, 2005

Related U.S. Application Data

(63) Continuation of application No. 09/997,033, filed on Nov. 20, 2001, now Pat. No. 6,879,601.

(51) Int. Cl.
*H04J 1/16* (2006.01)
(52) U.S. Cl. ............ 370/250; 370/485
(58) Field of Classification Search ......... 370/478–497, 370/241–259, 216–228
See application file for complete search history.

(56) References Cited

U.S. PATENT DOCUMENTS

| | | | | |
|---|---|---|---|---|
| 5,111,497 A * | 5/1992 | Bliven et al. | ............ | 379/27.01 |
| 5,140,630 A * | 8/1992 | Fry et al. | ............ | 379/179 |
| 5,195,087 A * | 3/1993 | Bennett et al. | ............ | 370/264 |
| 5,297,186 A * | 3/1994 | Dong | ............ | 375/222 |
| 5,668,857 A * | 9/1997 | McHale | ............ | 379/93.07 |
| 5,802,446 A * | 9/1998 | Giorgi et al. | ............ | 455/69 |
| 5,825,777 A * | 10/1998 | Komarek et al. | ............ | 370/458 |
| 6,091,713 A * | 7/2000 | Lechleider et al. | ............ | 370/248 |
| 6,137,839 A * | 10/2000 | Mannering et al. | ............ | 375/260 |
| 6,292,559 B1 * | 9/2001 | Gaikwad et al. | ............ | 379/417 |
| 6,345,071 B1 * | 2/2002 | Hamdi | ............ | 375/222 |
| 6,580,710 B1 * | 6/2003 | Bowen et al. | ............ | 370/353 |
| 6,687,261 B1 * | 2/2004 | Skeba et al. | ............ | 370/468 |

* cited by examiner

*Primary Examiner*—Kwang B Yao
*Assistant Examiner*—Alex Skripnikov
(74) *Attorney, Agent, or Firm*—Toler Law Group

(57) ABSTRACT

A system for implementing multiple communication channels on a single twisted pair transmission line is disclosed. The system derives additional communication channels by way of a separate transceiver unit for each derived line. Each transceiver unit communicates in a separate predetermined frequency band. Each transceiver unit, upon connection to the transmission line, automatically utilizes the lowest unoccupied frequency band by monitoring each frequency band for the presence of signal power. Thus, as many derived lines as will be supported by the customer transmission loop can be readily added.

20 Claims, 1 Drawing Sheet

METHOD AND SYSTEM FOR CONVEYING MULTIPLE CALLS ON A SINGLE TELEPHONE LINE

CROSS REFERENCE TO RELATED APPLICATIONS

This application is a continuation of U.S. patent application Ser. No. 09/997,033, filed on Nov. 20, 2001, which is a continuation of U.S. patent application Ser. No. 09/255,969, filed on Feb. 23, 1999 and issued as U.S. Pat. No. 6,324,167.

TECHNICAL FIELD

This invention relates in general to data communication across a telephone transmission line and, more particularly, to a method and system for simultaneously conveying multiple data transmissions over a single telephone transmission line.

BACKGROUND OF THE INVENTION

There is an increasing demand on local telephone companies to provide more communication channels at each customer premises. In an individual home, for example, there may be a need for two or more communication channels to carry voice data and one or more channels to support digital communications for such devices as a facsimile machine, a personal computer, or an internet terminal. Various equipment exists today to enable multiple communication signals to be conveyed on a single twisted paired telephone transmission line such as digital added main line (DAML) Systems, basic rate integrated services digital network (ISDN) systems, circuit multiplexers, and some implementations of IP telephony wherein voice signals are conveyed via Internet Protocol Packets routed through the Internet. In such existing systems, all of the communication channels are terminated by one transceiver-multiplexer at each end of the telephone transmission line, and all of the communication channels are combined by a common unit and transmitted as one modulated signal.

Recently, twisted pair telephone transmission line connections have been used for communicating two simultaneous channels such as digital data and analog voice signals. Typically, a high speed digital subscriber line (DSL) channel such as ADSL and a plain old telephone system (POTS) channel are established over a single twisted pair wire connection. A POTS splitter is typically utilized to decouple the channels into separate frequency bands. The POTS channel usually resides in a frequency spectrum of about 0 kHz to about 4 kHz, and the ADSL channel resides in a frequency spectrum of about 20 kHz to about 500 kHz. A low pass filter is often included in such a system to isolate the channels and minimize high frequency transients produced by on-hook/off-hook transitions which can degrade the high speed data transmission on the ADSL channel.

FIGS. 1A and 1B show one implementation of a DAML system just described. In FIG. 1A, the customer premises 10 is connected to the public switched telephone network 12 through the twisted pair transmission line 14 connected into the main distribution frame 16. DAML unit 20 is connected to the network interface device 18 through wall jack 19. The DAML unit 20 supports two independent communication channels 22, 24 by multiplexing the signals and transmitting them across transmission line 14 as a single modulated signal. Phone 1 communicates on baseband POTS. A low pass filter (LPF) 21 isolates the higher frequency transients and interference between the two communication channels. A corresponding DAML unit 13 and LPF 15 are connected on the network side of the system. FIG. 1B represents the frequency band of the signal transmitted across transmission line 14. Phone 1 communication is baseband POTS 23 and phones 2 and 3 communicate in a combined, higher frequency channel 25. Most DAML systems currently omit the baseband POTS channel.

Traditional DAML systems are designed to work on nearly all customer transmission loops. Since transmission signal quality is related to the customer distance from the central office, the number of communication channels a DAML system can support is limited by the worst-case scenario transmission loop in the overall system. In other words, the DAML system must be able to support the same number of additional communication lines for customers furthest from the central office as it does for customers nearest to the central office. Accordingly, the upper frequency range supported by the DAML units is artificially limited for customers whose transmission loops would support higher frequency ranges and, therefore, additional communication channels.

The present invention overcomes this drawback by deriving additional communication channels wherein each additional communications channel is modulated into a separate signal in a separate frequency band by way of a separate transceiver unit such as a DAML. For each additional communications channel desired, a separate transceiver unit is connected to the telephone transmission line at the customer premises in, for example, a wall jack. Each transceiver unit automatically utilizes the lowest unoccupied frequency band by monitoring each frequency band for the presence of signal power. This configuration enables transmission lines of customers closer to the central office to support several derived communications channels, whereas transmission lines for customers further from the central office with less usable bandwidth could still be used to support a fewer number of derived communications channels.

BRIEF DESCRIPTION OF THE DRAWINGS

For a more complete understanding of the invention, reference should now be had to the embodiments illustrated in greater detail in the accompanying drawings and described below by way of examples of the invention. In the drawings:

FIG. 2A is a graph of the frequency bands associated with the embodiment illustrated in FIG. 2A.

DETAILED DESCRIPTION OF THE PREFERRED EMBODIMENT(S)

Figure 1A:
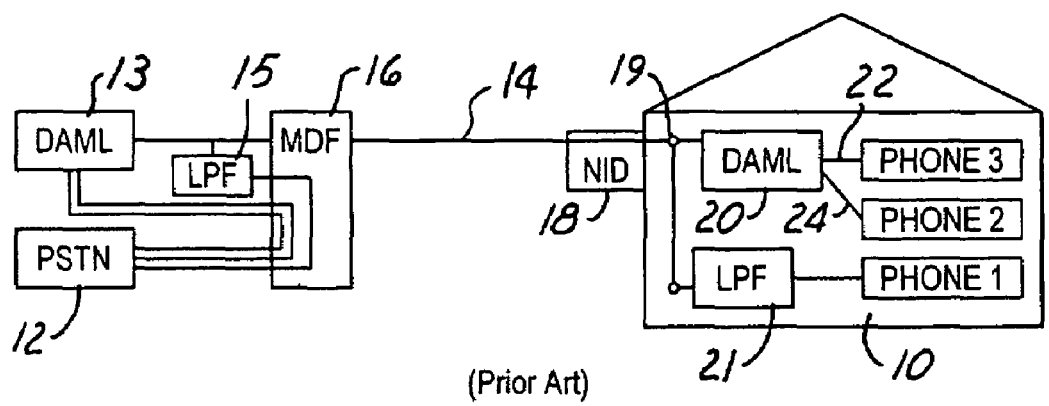
FIG. 1A is a schematic diagram of prior art DAML implementation.
Figure 2A:
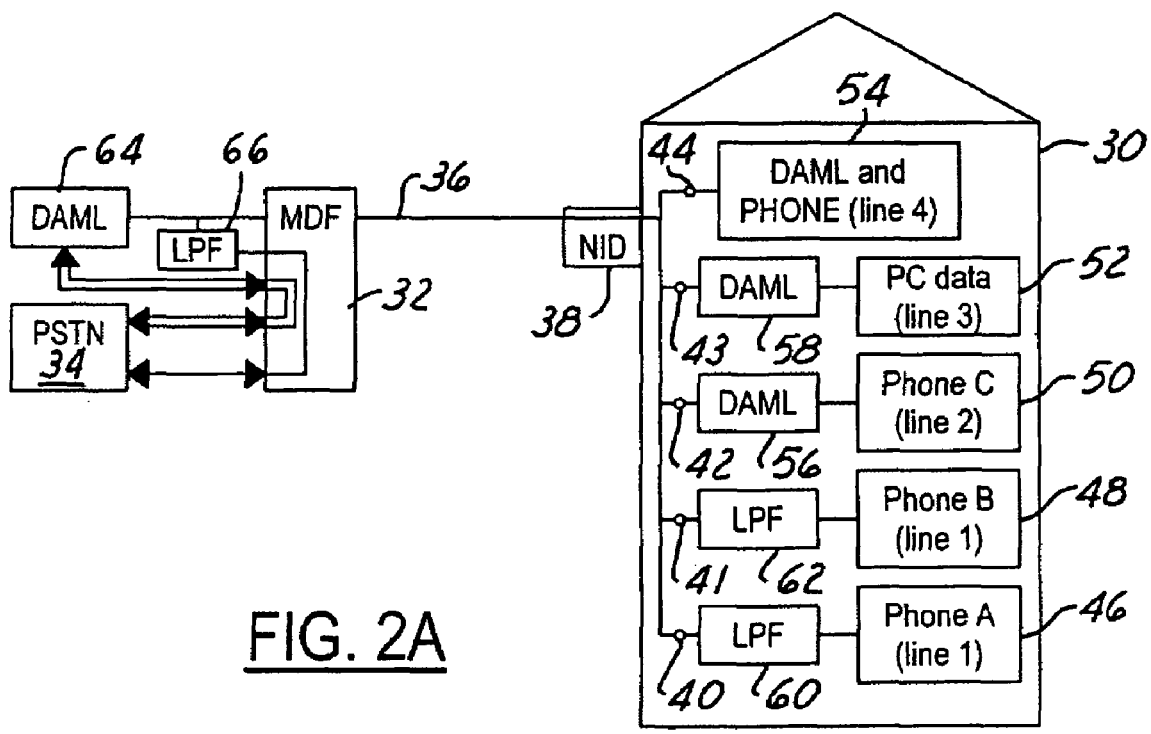
FIG. 2A is a schematic diagram of one embodiment of the present invention for adding additional communications channels to a single telephone line.
Figure 1B:
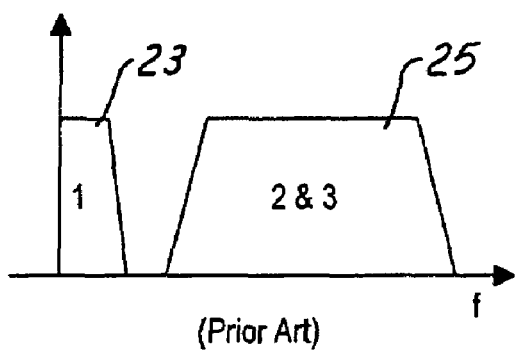
FIG. 1B is a graph of the frequency bands associated with the DAML implementation of FIG. 1A.

Referring to FIG. 2A, there is shown a schematic block diagram of one configuration of the present invention for adding additional communication channels to a single twisted pair telephone transmission line. In FIG. 2A, the customer premises 30 is connected to the main distribution frame 32 of the public switched telephone network 34 by twisted pair transmission line 36. The transmission line 36 is physically connected to the customer premises 30 at the network interface device 38. The transmission line 36 terminates at various locations within the customer premises 30 at a series of common telephone wall jacks 40-44. A plurality of transceiver/ multiplexer units are connected into the wall jacks 40-44. These include phone A 46, phone B 48, phone C 50, PC modem 52, and integrated DAML unit and phone 54. Between phone C 50 and wall jack 42, and between PC modem 52 and wall jack 43, are DAML units 56 and 58, respectively. Similarly, between phone A 46 and wall jack 40, and between phone B 48 and wall jack 41, are low pass filters 60 and 62, respectively.

The network-side of the transmission line 36 includes DAML unit 64 and low pass filter 66. The MDF 32 connects the telephone line 36 to the DAML unit 64 and the LPF 66. The LPF 66 extracts the 0-4 kHz band that carries channel 1. This is connected via the MDF 32 to the PSTN 34. The DAML unit 64 modulates and demodulates the voice signals that are connected, via the MDF 32, to the PSTN 34. The PSTN 34 switches each of the voice signals from the DAML unit 64 and LPF 66 as traditional circuit switched voice calls without any special actions required of the PSTN 34 due to the use of the DAML 64.

Figure 2B:
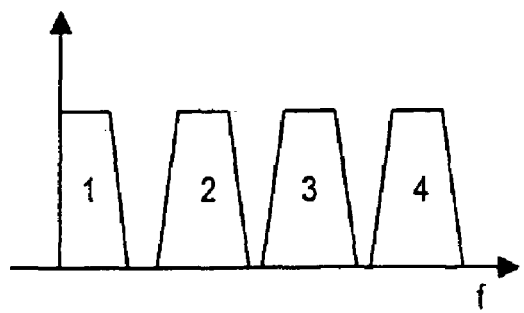

FIG. 2B represents a graph of the frequency bands associated with each of the communication channels of the configuration of FIG. 2A. In FIG. 2A, phones A and B 46, 48 transmit voice signals as a baseband analog signal on line 1, which is represented in FIG. 2B by POTS channel 1. This frequency band would typically have a range from 0 Hz to approximately 4 kHz. Derived lines 2, 3, and 4 use digital modulation transmission, wherein the signals for lines 2, 3, and. 4 are modulated into distinct frequency bands which are represented in FIG. 2B. Phones A and B 46, 48, represent extensions on the same line, thus their signals are superimposed into the same channel 1. Also, phones A and B 46, 48, are powered from the central office via transmission line 36, whereas the transmission units for the derived lines 2, 3, and 4 are typically powered from a power source at the customer premises 30 such as commercial AC power.

Because physically separate transceiver units are used to derive each additional communications channel, derived lines can be easily placed in separate rooms within the customer premises 30, and additional derived lines can be readily added. This also allows the same type of transceiver equipment to be used regardless of the number of derived lines. These derived lines, or communications channels, can be used for voice, facsimile, or data transmissions such as, for example, PC access to the Internet. The number of derived lines can be one or more, and a single transceiver unit may derive more than one line.

The transceiver units used to derive additional communications channels are preferably implemented using ADSL-lite (as described in ITU Recommendation G.992.2) or splitterless ADSL technology. This provides the benefit of a customer-end transceiver-multiplexer that is easily installed by the customer within the premises 30 without requiring the cost and inconvenience of a premises installation visit by a telephone company technician. Although the preferred location for the DAML unit is within the customer premises 30, they could also be deployed at a site outside the premises 30 as part of the telephone company's network.

As mentioned above, low pass filters 60, 62 are included to isolate the higher frequency derived communications channels from on-hook/off-hook transients created by phones A and B 46, 48. The LPF 60, 62 is typically located at the wire connecting the phone to the wall jack.

The method of deriving additional communications channels will now be described by way of example with reference to FIGS. 2A and 2B. Assume that there is one communications channel at customer premises 30 and that phone A 46 and phone B 48 represent extensions on that same communications channel (line 1). To add an additional communications channel such as phone C on line 2, a DAML unit 56 is connected to the wall jack 42 at the customer premises 30. In addition, low pass filters 60 and 62 will preferably be added between phones A and B and wall jacks 40 and 41 to isolate the higher frequency communications channel of line 2. The DAML unit 56 is configured to recognize discrete frequency bands above the POTS channel (line 1). These frequency bands are predefined at the time of the unit's manufacture. For example, frequency band 2 could be defined as 40-60 kHz, frequency band 3 could be defined as 70-90 kHz, frequency band 4 could be defined as 100-120 kHz, etc. These frequency bands would correspond to the frequency bands represented in the graph of FIG. 2B for lines 2, 3 and 4.

Upon connection to the wall jack 42, DAML unit 56 observes the signal energy in each of the defined frequency bands starting with the lowest. The DAML unit 56 utilizes the lowest frequency band for which the observed signal power is less than a threshold value which represents the minimal expected signal power observed for a frequency band in use by another unit. In this example, DAML unit 56 would likely transmit signals in frequency band 2 since no additional DAML units are connected to the transmission line 36 at this time. Phone C would then communicate over line 2 through DAML unit 56.

To derive additional communication channels (lines 3 and 4), additional DAML units 54 and 58, are connected to the transmission line 36 through wall jacks 44 and 43, respectively. DAML unit 54 is shown as an integrated telephone and DAML unit. Such a unit could have a reduced cost and simplify the installation processor by reducing the number of components to interconnect. In addition, line 3, as shown in FIG. 2A is used to support PC data transmission. Of course, phone C 50, PC 52 and integrated telephone unit 54 are merely illustrative of digital communications devices and could be substituted for any such device. Additional derived lines can be added in a similar manner so long as the usable bandwidth on the customer transmission loop supports such lines. Hence, customers located closer to the telephone company's central office would likely be able to support more derived communication lines than customers located further from the central office because increased distance typically reduces the usable bandwidth of a customer transmission loop.

Upon connection, each DAML unit observes the signal energy in each of the defined frequency bands. The signal energy in each of the frequency bands is monitored by the use of a fast Fourier transform algorithm implemented in firmware on a digital signal process (DSP) integrated circuit located within each DAML unit. The signal power within each predefined frequency band is integrated across the frequency band and averaged over time. The DAML unit utilizes the lowest frequency band for which the observed signal power is less than a threshold value that represents the minimum expected signal power observed for a frequency band in use by another unit. To minimize the probability of contention in the event that several DAML units on a line attempt to start up simultaneously, each DAML unit preferably monitors the signal energy in a frequency band for a bounded random duration of time. Once the DAML unit has found a frequency band with no apparent signal power, it transmits its signal in that frequency band by use of a pass band modulation method. For example, quadrature amplitude modulation (QAM) with a carrier placed at the center of the chosen frequency band. To reduce interference between frequency bands, filtering is implemented by way of the DSP. Interference can be further reduced by placing an empty guard band between each of the defined frequency bands.

As an alternative embodiment, each customer line can be oversubscribed. In other words, the number of communication channels can exceed the number of available frequency bands provided that only as many transceiver units as there are frequency bands are transmitting or off-hook at any given time. In addition, in the event that a DAML unit determined that its signal transmission quality as measured by the signal-to-noise ratio or bit error rate was unacceptable, the DAML unit would stop transmission and search for another acceptable frequency band.

With regard to the transceiver units, if higher data rates or multiple derived phone lines are required of a single transceiver unit, multiple frequency bands, preferably adjacent, would be utilized. Thus, applications such as video can be supported by combining frequency channels.

In another embodiment, one telephone transmission line can be used to support more than one customer premises. In this scenario, the single twisted pair telephone transmission line is connected to multiple customer sites wherein transceiver units such as those described with reference to FIG. 2A are used at each customer site to create communications channels in separate distinct frequency bands. In such a case, however, it is important that only one customer site use the base band POTS frequency channel connected through a low pass filter, otherwise a "party line" would result.

In still another embodiment, the transceiver unit 64 at the central office could be divided into separate transceiver units for each derived line.

While the invention has been described in connection with one or more embodiments, it is to be understood that the invention is not limited to these embodiments. On the contrary, the invention covers all alternatives, modifications, and equivalents as may be included within the scope and spirit of the appended claims.

What is claimed is:

1. A method for establishing at least one separate communication channel on a single twisted-pair telephone transmission line, the method comprising:
   interfacing a first transceiver unit with the single twisted-pair telephone transmission line, wherein interfacing is accomplished via a network interface device (NID) or a wall jack;
   operating the first transceiver unit to monitor a corresponding signal power level in each of a first plurality of predefined frequency bands for which the first transceiver unit is pre-configured to transmit and receive communication signals;
   operating the first transceiver unit to identify a first available frequency bands comprising to a lowest frequency band of the first plurality of predefined frequency bands having the corresponding signal power level that is less than a predetermined threshold signal power level; and
   establishing a first separate communication channel on the single twisted-pair telephone transmission line by operating the first transceiver unit to transmit and receive first communication signals over the single twisted-pair telephone transmission line within the first available frequency band.

2. The method according of claim 1, wherein the first transceiver unit is a digital added main line (DAML) unit.

3. The method of claim 2, wherein the digital added main line (DAML) unit includes a telephone integrated therewith.

4. The method of claim 2, wherein the digital added main line (DAML) unit includes a digital signal processing (DSP) circuit.

5. The method of claim 1, wherein the first plurality of predefined frequency bands comprise non-overlapping frequency bands.

6. The method of claim 1, wherein each of the first plurality of predefined frequency bands has a corresponding lower frequency limit that is greater than 4kilohertz.

7. The method of claim 1, wherein said predetermined threshold signal power level corresponds to an expected minimum signal power level of a second transceiver unit that had previously established a communication channel on the said single twisted-pair telephone transmission line.

8. The method of claim 1, further comprising:
   connecting a device comprising at least one of a telephone, a computer, and a facsimile machine to the first transceiver unit; and
   operating the device to transmit and receive communication signals, via the first transceiver unit, over the single twisted-pair telephone transmission line within the first separate communication channel.

9. The method of claim 1, further comprising
   interfacing the second transceiver unit to the single twisted-pair telephone transmission line;
   operating the second transceiver unit to monitor a corresponding signal power level in each of a second plurality of predefined frequency bands for which the second transceiver unit is pre-configured to transmit and receive communication signals;
   operating the second transceiver unit to identify a second available frequency band comprising a lowest frequency band of the second plurality of predefined frequency bands having a corresponding signal power level that is less than the predetermined threshold signal power level; and
   establishing a second separate communication channel on the single twisted-pair telephone transmission line by operating the second transceiver unit to transmit and receive second communication signals over the single twisted-pair telephone transmission line within the second available frequency band.

10. A method of establishing a separate communication channel on a single twisted-pair telephone transmission line, said method comprising:
    interfacing a transceiver unit with the single twisted-pair telephone transmission line, wherein the transceiver unit is a digital added main line (DAML) unit;
    operating the transceiver unit to successively monitor the corresponding signal power level in each of a first plurality of predefined frequency bands for which the first transceiver unit is pre-configured to transmit and receive communications signals;
    operating the transceiver unit to identify a first available frequency band comprising a lowest of the first plurality of predefined frequency bands having a corresponding signal power level that is less than a predetermined threshold signal power level;
    operating the transceiver unit to transmit and receive communication signals over the said single twisted-pair telephone transmission line within the first available frequency band to establish a separate communication channel on the single twisted-pair telephone transmission line.

11. The method of claim 10, wherein the digital added main line (DAML) unit includes a digital signal processing (DSP) circuit.

12. The method of claim 10, wherein the first plurality of predefined frequency bands are non-overlapping.

13. The method of claim 10, wherein each of the first plurality of predefined frequency bands has a corresponding lower frequency limit that is greater than 4 kilohertz.

14. The method of claim 10, wherein the predetermined threshold signal power level corresponds to a minimum level of signal power of a transceiver unit that had previously established a communication channel on the single twisted-pair telephone transmission line.

15. The method of claim 10, further comprising:
   connecting a device selected from the group consisting of a telephone, a computer, and a facsimile machine to said transceiver unit; and
   operating the device to transmit and receive communication signals, via the transceiver unit, over said single twisted-pair telephone transmission line within the separate communication channel.

16. The method of claim 10, further comprising:
   interfacing an additional transceiver unit with the single twisted-pair telephone transmission line;
   operating the additional transceiver unit to successively monitor the corresponding signal power level in each of a second plurality of predefined frequency bands in which the additional transceiver unit is pre-configured to transmit and receive communication signals;
   operating the additional transceiver unit to identify a second available frequency band comprising a lowest frequency band of the second plurality of predefined frequency bands having a signal power level that is less than the predetermined threshold signal power level; and
   operating the additional transceiver unit to transmit and receive communication signals over the single twisted-pair telephone transmission line within the second available frequency band to establish another separate communication cannel on the single twisted-pair telephone transmission line.

17. A method of establishing at least one separate communication channel on a single twisted-pair telephone transmission line, said method comprising:
   interfacing a transceiver unit with the single twisted-pair telephone transmission line;
   identifying a lowest available frequency band by monitoring a corresponding signal power level in each of a plurality of predefined frequency bands for which the transceiver unit is pre-configured to transmit and receive communications signals, wherein the corresponding signal power level of the lowest available frequency band is less than a predetermined threshold signal power level, wherein each successively measured frequency band comprises a higher frequency range than each previously measure frequency band;
   operating said transceiver unit to discontinue the successive monitoring after the lowest available frequency band is identified; and
   operating the transceiver unit to transmit and receive communication signals over the signal twisted-pair telephone transmission line within the lowest available frequency band to establish a separate communication channel on the single twisted-pair telephone transmission line.

18. The method of claim 17, wherein the plurality of predefined frequency bands comprise non-overlapping frequency ranges.

19. The method of claim 10, wherein interfacing is accomplished via a wall jack.

20. The method of claim 10, wherein interfacing is accomplished via a Network Interface Device (NID).

* * * * *